April 18, 1961    A. C. SLADKY ET AL    2,979,760
UTENSIL HANDLE CONSTRUCTION
Filed May 31, 1957
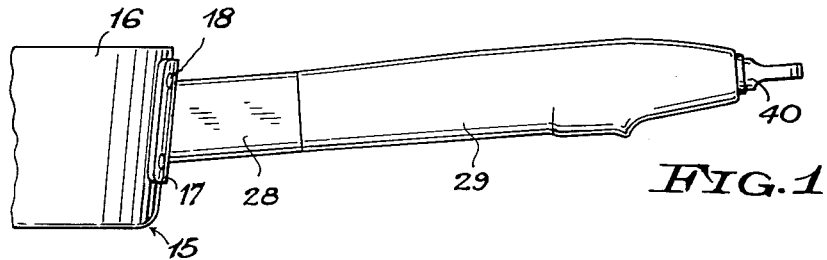
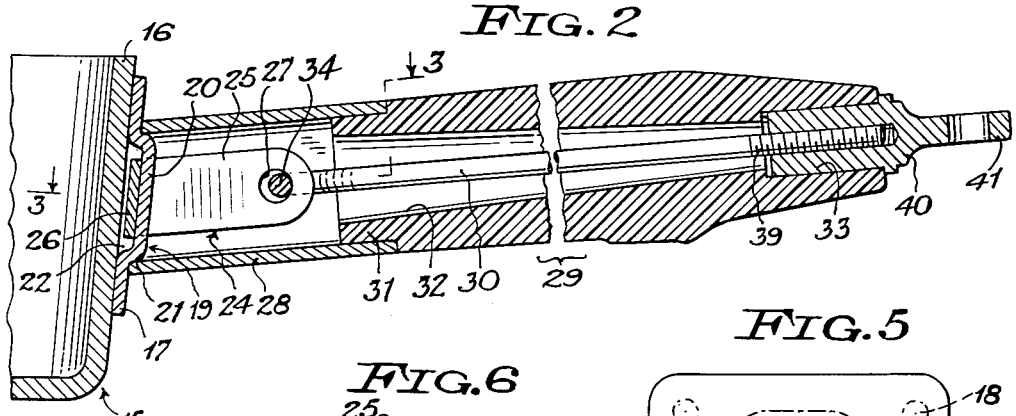
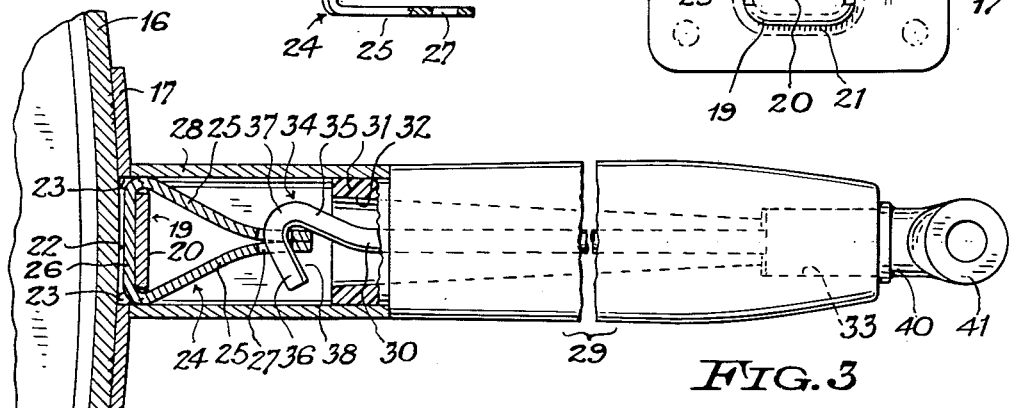
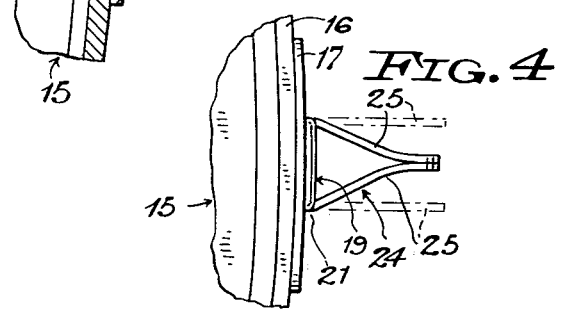
INVENTORS
ALEXANDER C. SLADKY
AND RUDOLPH F. GEHM
BY Christopher L. Wood
ATTORNEY

United States Patent Office 2,979,760
Patented Apr. 18, 1961

2,979,760

UTENSIL HANDLE CONSTRUCTION

Alexander C. Sladky, Ellison Bay, and Rudolph F. Gehm, Kewaunee, Wis., assignors to Leyse Aluminum Company, Kewaunee, Wis., a corporation of Wisconsin Filed May 31, 1957, Ser. No. 662,739

2 Claims. (Cl. 16—110)

This invention relates to handles for cooking utensils and the like.

An object of the invention is to provide a utensil handle of simple, rugged and inexpensive construction including improved means for attaching a handle-clamping rod and positioning handle-forming parts.

Another object is to provide a utensil handle mounting including an improved anchor member which is easily applied to an associated mounting member and is so arranged as to resist dislodgment when tensioned by the handle-clamping rod.

A further object is to provide a handle mounting in which the anchor member is bendable to its final form after insertion in the mounting member, and which will permit these members to form a connected sub-assembly.

The invention further consists in the several features hereinafter described and claimed.

In the accompanying drawing,

Fig. 1 is a side elevational view of a handle of the invention attached to a utensil;

Fig. 2 is a longitudinal vertical sectional view of the attached handle;

Fig. 3 is a top view of the attached handle, parts being shown in section along the line 3—3 of Fig. 2;

Fig. 4 is a fragmentary top view of the utensil with a handle mounting secured thereto, handle parts being omitted, and a partially formed condition of an anchor member of the mounting being shown in broken lines;

Fig. 5 is a detail face view of a mounting plate for the handle, and

Fig. 6 is a top view of the anchor member as it appears before application to the mounting plate, parts being broken away and parts being shown in section.

In the drawing, 15 designates a metallic container or vessel having a side wall 16. By way of example, the container may be a frying pan or sauce pan formed of cast or sheet aluminum alloy.

A generally rectangular mounting plate 17, such as of sheet aluminum alloy, is suitably secured to the outer face of the utensil side wall 16, as by spot welding 18, the plate being curved or bent to conform to the outer surface of the utensil side wall. An embossment 19 is formed on the middle portion of the mounting plate, as by a pressing operation, and presents a flat wall portion 20 and a peripheral shoulder 21. The embossment is here shown to be of generally rectangular shape with rounded corners, but oval and other non-circular shapes may be provided. The formation of the embossment 19 on the mounting plate leaves a shallow, flat-bottomed inner recess or cavity 22 in the plate, this recess being subsequently closed by the side wall of the utensil. A pair of parallel slots 23 are formed in the embossment adjacent to opposite sides thereof, as along the edges of the embossment, these slots extending in a generally vertical direction.

The mounting plate slots 23 receive therethrough portions of a loop-shaped anchor member 24 which is inserted in place before the mounting plate is attached to the utensil side wall. The anchor member comprises a strap or band of flat metal, such as aluminum alloy, which is reversely bent from a flat blank to form a pair of arms 25 extending from a flat, continuous, intermediate bearing portion or cross portion 26, the free end portions of the arms being provided with aligned, transverse, hook-receiving openings 27. The anchor strap is first bent to a U-shape, as seen in Fig. 6, to dispose the arms in parallel relation. The parallel arms are then inserted through the mounting plate slots 23 from the recessed face of the plate, and the cross portion 26 of the bent anchor strap is seated flatwise against the rear face of the embossment wall 20. The strap arms 25 are thereupon bent toward each other to an inwardly converging position to bring the arm openings 27 into registering relation, the anchor strap then being in the form of a generally triangular loop, and the outer ends of the arms being approximately parallel and close together and preferably in abutment, although not necesarily so. The anchor strap and mounting plate thus form a connected sub-assembly pending the attachment of the mounting plate to the container. In some instances, the strap arms may be brought together after the mounting plate is attached to the utensil.

A spacer sleeve or ferrule 28 and a handle member or hand grip 29 aligned therewith are secured to the mounting plate by a hook-ended clamping rod or bolt 30, as hereinafter described, the sleeve being interposed between the hand grip and the mounting plate.

The spacer sleeve 28, which is of generally square or other non-circular cross-section and which may be cut from a length of metal tubing, is positioned and held against rotation by the mounting plate embossment 19, the inner end of the sleeve fitting over the peripheral shoulder 21 of the embossment and abutting and fitting against the outer face of the mounting plate around the embossment. The opposite sides of the loop-shaped anchor strap may also serve to position the side walls of the spacer sleeve, as seen in Fig. 3. The end of the sleeve adjacent to the mounting plate is here shown to be cut or formed on a bias to place the handle at a selected inclination. The spacer sleeve is made of a suitable metal such as aluminum or stainless steel.

The handle member or hand grip 29, which is made of "Bakelite," comprising a phenolic-formaldehyde condensation product, wood, or other suitable heat-insulating material, has a reduced shouldered inner end 31 of generally square or other non-circular shape fitting in the adjacent end of the spacer sleeve 28 and held against relative rotation and abutting against the end edge face of the sleeve. The hand grip has formed longitudinally therethrough a tapered bore 32 which receives therein the clamping rod 30, the bore 32 communicating with a cylindrical counterbore 33 at the outer end of the hand grip.

The clamping rod 30 is preferably made of steel and is formed at its inner end with an angular hook portion 34 which is engaged in the aligned openings 27 of the anchor strap arms 25, the hooked engagement preventing relative rotation of the rod with respect to the anchor member and mounting plate. The hook portion 34 comprises an oblique inner section 35 extending from the rod at one side thereof at a small angle, for example about 20°, to the axis of the rod, and an oblique reversely bent terminal section 36 extending from a rounded junction 37 with the inner section 35 toward the opposite side of the rod axis, the hook sections forming a V-shaped throat 38 having an included angle of about 45°. The apertured laterally abutting ends of anchor strap arms tend to wedge themselves in the apex portion of the V-shaped throat of the hook portion 34, and the shape of the hook portion is such as to resist spreading of this portion by tension on the rod. The outer end of the rod 30 has a screw-threaded portion 39 which is engaged in a flanged nut 40 of conventional type for detachably clamping the handle and sleeve in place, the nut being made of suitable metal such as aluminum or stainless steel. The nut fits in the counterbore 33 of the hand grip and is provided at its outer end with an eye 41 for turning the nut and for hanging the utensil.

The loop-shaped anchor strap 24 can be made of a relatively soft bendable metal, such as an aluminum alloy or soft sheet steel, since the strap is under tension after the clamping rod is tightened, and there are no strap ends in the mounting plate recess tending to pull out of the plate.

In assembling the utensil, the parallel arms 25 of the partially formed, U-shaped anchor band or strap 24, Fig. 6, are projected through the spaced slots 23 of the embossed mounting plate 17 from the recessed face of the plate, and after the cross portion 26 of the strap is seated in the recess the apertured strap arms are bent or deflected toward each other in inwardly converging relation to form the triangular loop, thus holding the strap on the plate. The plate is then secured to the container side wall 16, as by the spot welding 18, thus confining the anchor strap in the mounting plate recess 22. As the projecting arms of the anchor strap are relatively short, they will not interfere with the plate-attaching operation. The partially completed utensil assembly is shown in Fig. 4, the broken lines showing the strap arms before the final bending operation.

To complete the assembly of the utensil, the hooked end 34 of the clamping rod 30 is engaged in the transverse openings 27 formed in the laterally adjacent or abutting outer ends of anchor strap arms, and the spacer sleeve 28 is passed over the rod and positioned over the mounting plate embossment 19. The tubular hand grip 29 is then passed over the rod into engagement with the sleeve, and the nut 40 is engaged on the threaded outer end portion of the rod, thus securing the hand grip and sleeve firmly in place against rotation. Tightening of the nut can be effected by a simple turning tool, such as a nail or a screw-driver shank inserted in the eyed end 41 of the nut.

In many instances, the partially assembled device shown in Fig. 4 can be shipped, stored and sold in this condition, together with the remaining separate handle parts, thus facilitating packing and shipping. The completion of the assembly can readily be effected by the dealer or the ultimate user.

The handle structure of the invention is of strong and rugged construction and is capable of inexpensive manufacture and easy assembly. If the non-metallic hand grip should become damaged or broken, it can readily be replaced.

We claim:

1. In a utensil handle mounting, a mounting plate adapted to be rigidly secured to a utensil and having an embossment having a flat portion provided with a pair of laterally spaced parallel slots therethrough communicating with a flat-bottomed recess behind the embossment, each of said slots opening forwardly and having parallel sides, a loop-shaped anchor strap of bendable sheet metal having a continuous intermediate portion in said recess abutting flatwise against the inner face of said embossment between said slots and further having a pair of bendable arms passing outwardly through said slots, said recess being slightly deeper than the thickness of said strap, and each slot being slightly wider than the thickness of said strap, said arms being inwardly convergent and having substantially aligned transverse openings in their outer end portions, and a strap-tensioning handle-retaining rod having a terminal hook engaged in said strap openings.

2. In a utensil handle mounting, a mounting plate adapted to be rigidly secured to a utensil and having an embossment having a flat portion provided with a pair of laterally spaced parallel slots therethrough adjacent to opposite sides of said embossment and communicating with a recess behind the embossment, each of said slots opening forwardly and having parallel sides, a loop-shaped metal anchor strap having a continuous intermediate portion bearing against the inner face of said embossment between said slots and further having a pair of arms passing outwardly through said slots, each slot being slightly wider than the thickness of said strap, said arms being initially parallel for insertion through said slots from the recessed side of said plate, and said arms being bendable and convergent inwardly and having apertured outer end portions, and a strap-tensioning handle-retaining rod having a hooked end engageable with the apertured outer end portions of said arms.

References Cited in the file of this patent

UNITED STATES PATENTS

| | | |
|---|---|---|
| 310,716 | Palmer | Jan. 13, 1885 |
| 702,605 | Voight | June 17, 1902 |
| 1,083,780 | Villard | Jan. 6, 1914 |
| 1,690,408 | Hasenflue | Nov. 6, 1928 |
| 1,929,700 | Malone | Oct. 10, 1933 |
| 2,521,463 | Kircher | Sept. 25, 1950 |
| 2,624,066 | Fry | Jan. 6, 1953 |

FOREIGN PATENTS

| | | |
|---|---|---|
| 110,353 | Australia | Apr. 24, 1940 |